3,634,279
TRANSPARENT PLASTIC SHEET FOR MAKING WELDERS' PROTECTIVE SCREENS OR GOGGLES
Christian Leuschke, Dormagen-Horrem, and Wilhelm Rohm, Stommeln, Germany, assignors to Farbenfabriken Bayer Aktiengesellschaft, Leverkusen, Germany
No Drawing. Filed Apr. 19, 1968, Ser. No. 722,563
Claims priority, application Germany, Apr. 29, 1967, F 52,290
Int. Cl. F21v 9/04, 9/06; G02c 7/10
U.S. Cl. 252—300          3 Claims

ABSTRACT OF THE DISCLOSURE

Transparent plastic sheets for welders' protective screens made from cellulose esters, having a Vicat heat distortion of at least 104° C.

---

The invention relates to transparent plastic sheets for making welders' screens from cellulose esters having a Vicat heat distortion of at least 104° C., the harmful rays occurring during welding work, particularly in electric arc welding, being absorbed by additives.

It is already known that welders' protective screens and goggles or windows in guards absorbing harmful rays (U.V. radiation, heat radiation) can be made from normally esterified cellulose acetate sheets coloured with dyes and/or containing pigments.

Cellulose acetate is highly suitable for the production of such articles due to its excellent transparency and good colouring properties. However, one disadvantage of the normally esterified cellulose acetate hitherto employed is its low degree of esterification (contains less than 55% acetic acid) and high plasticizer content (more than 20% plasticizer). As a result its softening point is relaively low and considerable deformation can therefore occur when it is subjected to intense radiant heat (see DIN 53,460 for determination of Vicat heat distortion, referred to in R. Houwinp, Chemie Und Technologie der Kunststoffe, vol. I., pp. 651 and 652, 3rd edition, Leipzig 1954).

It is an object of this invention to provide transparent plastic sheets which do not have the disadvantages mentioned in column 1, lines 20–25.

This object is accomplished by a transparent plastic sheet for production of welders' screens or goggles, comprising an organic cellulose ester, a radiation absorber, and finely divided carbon black, said organic cellulose ester having a Vicat heat distortion of at least 104° C.

The organic cellulose esters used for this purpose are highly esterified cellulose acetates containing at least 55% by wt. acetic acid and not more than 20% by wt. plasticizer, cellulose propionates containing not more than 10% by wt. plasticizer, cellulose acetate butyrates containing not more than 10% by wt. plasticizer and a mixture of cellulose acetate butyrate and cellulose propionate containing not more than 10% by wt. plasticizer.

The above-mentioned organic cellulose esters contain 0.05 to 1% by wt. radiation absorber, 0.01 to 1% by wt. finely divided carbon black with an average particle size of less than 120 A. and optionally 0.01 to 0.3% by wt. of a dye soluble in organic cellulose esters. Sheets of this kind made of the above-mentioned organic cellulose esters have very good stability under heat and are therefore highly suitable for making welders' screens or goggles. Sheets with thicknesses of 0.3 to 4 mm. can be employed, according to end use.

The following compounds are chiefly suitable as radiation absorbers: benzotriazole derivatives, benzophenone derivatives and substituted acrylonitrile derivatives.

The folowing dyes soluble in organic cellulose esters are mainly used: Heliogen Green (colour index I, 2783), Heliogen Blue (colour index I, 2773).

The following examples are to further illustrate the invention without limiting it.

EXAMPLE 1

82.700% by wt. of a cellulose acetate containing 56% by wt. acetic acid and 17% by wt. plasticizer based on a phthalic acid ester, 0.241% by wt. radiation absorber based on a substituted acrylonitrile derivative, 0.030% by wt. Heliogen Green and 0.029% by wt. carbon black with an average particle size of less than 120 A. are mixed and plastified on a hot roll or in an extruder, homogenized and afterwards granulated. The chips obtained in this way are then injection moulded or extruded to make sheets. The Vicat heat distortion of these sheets is 104° C.

The percentages by weight are based on the total of ingredients used.

EXAMPLE 2

Sheets 2 mm. thick were made in a similar manner to Example 1 from 92.200% by wt. cellulose propionate and 7.500% by wt. plasticizer based on a phthalic acid ester, 0.241% by wt. radiation absorber based on a substituted acrylonitrile derivative, 0.030% by weight Heliogen Green and 0.029% by weight carbon black (approx. 120 A.). Vicat distortion: 104° C.

The percentages by weight are based on the total of ingredients used.

EXAMPLE 3

Sheets 2 mm. thick were made in a similar manner to Example 1 from 96.200% by wt. cellulose acetate butyrate and 3.500% by wt. plasticizer based on an adipic acid ester, 0.241% by wt. radiation absorber based on a substituted acrylonitrile derivative, 0.030% by wt. Heliogen Green and 0.029% by wt. carbon black. Vicat heat distortion: 105° C.

The percentages by weight are based on the total of ingredients used.

EXAMPLE 4

Sheets 2 mm. thick were produced in accordance with the method described under Example 1 from 12.000% by wt. cellulose acetate butyrate, 82.200% by wt. cellulose propionate, 5.500% by wt. plasticizer based on a mixture of adipic acid and phthalic acid ester, 0.241% by wt. radiation absorber based on a substituted acrylonitrile derivative, 0.030% by wt. Heliogen Green and 0.029% carbon black (120 A.). Vicat heat distortion: 105° C.

The percentages by weight are based on the total of ingredients used.

A 2 mm. thick sheet produced in accordance with Examples 1 to 4 has the following transmission values:

(a) Spectral transmittance $\tau\lambda$

| $\lambda$, nm. | $\tau\lambda$, percent | $\Delta\tau/\tau$ percent |
|---|---|---|
| 313 | $2 \times 10^{-6}$ | |
| 365 | $1 \times 10^{-6}$ | |
| 405 | $3.4 \times 10^{-4}$ | $\pm 5$ |
| 555 | 0.093 | $\pm 5$ |
| 565 | 0.086 | $\pm 5$ |
| 589 | 0.040 | $\pm 5$ |
| 671 | 0.020 | $\pm 5$ |

(b) Total transmittance $\tau_v$ in visible and $\tau_{UR}$ in infra-red spectral region:

$\tau_v$ 0.055%    $\Delta\tau/\tau \pm 5\%$
$\tau_{UR}$ 4.4%    $\Delta\tau/\tau \pm 5\%$ (c) Selective transmission for wavelengths $\lambda$ 365 nm. $\tau\lambda$ $<2 \times 10^{-6}\%$
$\lambda$ 313 nm. $\tau\lambda$ $<1 \times 10^{-6}\%$

What we claim is:

1. A transparent plastic sheet, having a Vicat heat distortion of at least 104° C., adapted for use in welders' screens or goggles comprising
   - (A) an organic cellulose ester, selected from the group consisting of cellulose acetate containing at least 55% by weight of acetic acid, cellulose propionate, and cellulose acetate-butyrate and mixtures thereof;
   - (B) 0.05 to 1% by weight of a radiation absorber selected from the group consisting of benzotriazole derivatives, benzophenone derivatives and substituted acrylonitrile derivatives;
   - (C) 0.01 to 1% finely divided carbon black with an average particle size of less than 120 A.; and
   - (D) a plasticizer selected from the group consisting of a phthalic acid ester, an adipic acid ester, and mixtures thereof, said plasticizer being present in not more than 20% by weight in case of the cellulose acetate, not more than 10% by weight in case of the other esters and mixtures thereof.

2. The composition of claim 1 wherein the organic cellulose ester is cellulose propionate.

3. The composition of claim 1 wherein the organic cellulose ester is cellulose acetate-butyrate.

References Cited
UNITED STATES PATENTS

| | | | |
|---|---|---|---|
| 3,111,417 | 11/1963 | Stohel et al. | 252—300 |
| 3,105,761 | 10/1963 | Foris | 252—300 |
| 3,100,716 | 8/1963 | Kibler et al. | 252—300 |
| 3,072,602 | 1/1963 | Clark et al. | 252—300 |
| 3,060,029 | 10/1962 | Cerwonka | 252—300 |
| 2,925,352 | 2/1960 | Lowe | 106—196 |
| 2,631,499 | 3/1953 | Riley | 252—300 |
| 3,369,916 | 1/1968 | Corbiere et al. | 106—181 |

GEORGE F. LESMES, Primary Examiner

J. P. BRAMMER, Assistant Examiner

U.S. Cl. X.R.

106—181, 176